US011578216B2

(12) United States Patent
Mitsuhashi et al.

(10) Patent No.: US 11,578,216 B2
(45) Date of Patent: Feb. 14, 2023

(54) ANTIFOULING ARTICLE

(71) Applicant: DAIKIN INDUSTRIES, LTD., Osaka (JP)

(72) Inventors: Hisashi Mitsuhashi, Osaka (JP); Yasuhiro Nakai, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 746 days.

(21) Appl. No.: 16/466,392

(22) PCT Filed: Nov. 28, 2017

(86) PCT No.: PCT/JP2017/042563
§ 371 (c)(1),
(2) Date: Jun. 4, 2019

(87) PCT Pub. No.: WO2018/110271
PCT Pub. Date: Jun. 21, 2018

(65) Prior Publication Data
US 2019/0300726 A1 Oct. 3, 2019

(30) Foreign Application Priority Data
Dec. 13, 2016 (JP) .............................. JP2016-241421

(51) Int. Cl.
| C09D 5/16 | (2006.01) |
| C09D 171/02 | (2006.01) |
| C09K 3/18 | (2006.01) |
| C03C 17/42 | (2006.01) |
| G02B 1/18 | (2015.01) |
| C09D 7/40 | (2018.01) |
| B32B 17/00 | (2006.01) |
| B32B 27/30 | (2006.01) |
| B32B 9/00 | (2006.01) |
| B32B 33/00 | (2006.01) |
| C09D 127/12 | (2006.01) |
| C09D 171/00 | (2006.01) |
| C08G 65/00 | (2006.01) |

(52) U.S. Cl.
CPC .............. *C09D 5/1637* (2013.01); *B32B 9/00* (2013.01); *B32B 17/00* (2013.01); *B32B 27/30* (2013.01); *B32B 33/00* (2013.01); *C03C 17/42* (2013.01); *C08G 65/007* (2013.01); *C09D 5/16* (2013.01); *C09D 7/40* (2018.01); *C09D 127/12* (2013.01); *C09D 171/00* (2013.01); *C09D 171/02* (2013.01); *C09K 3/18* (2013.01); *G02B 1/18* (2015.01); *C03C 2217/70* (2013.01); *C03C 2218/151* (2013.01); *C03C 2218/153* (2013.01); *C03C 2218/32* (2013.01)

(58) Field of Classification Search
None
See application file for complete search history.

(56) References Cited

U.S. PATENT DOCUMENTS

| 6,183,872 | B1 | 2/2001 | Tanaka et al. | |
| 7,166,235 | B2* | 1/2007 | Majeti | A61K 8/892 |
| | | | | 252/8.57 |
| 9,208,052 | B2* | 12/2015 | Archer | G06F 11/3404 |
| 9,228,052 | B2* | 1/2016 | Sakoh | C08G 65/002 |
| 9,745,662 | B2* | 8/2017 | Memering | C23C 14/0676 |
| 9,963,597 | B2* | 5/2018 | Aizenberg | C10M 171/00 |
| 9,969,890 | B2* | 5/2018 | Takao | C08G 65/007 |
| 10,138,391 | B2* | 11/2018 | Takao | C08J 7/0427 |
| 11,155,508 | B2* | 10/2021 | Hoshino | C07F 7/1804 |
| 2009/0208728 | A1 | 8/2009 | Itami et al. | |
| 2011/0098402 | A1* | 4/2011 | Yamane | C08L 71/02 |
| | | | | 524/521 |
| 2012/0164454 | A1* | 6/2012 | Sung | C23C 16/26 |
| | | | | 428/408 |
| 2015/0307719 | A1* | 10/2015 | Mitsuhashi | C07F 7/188 |
| | | | | 428/447 |
| 2017/0233602 | A1 | 8/2017 | Itami et al. | |
| 2017/0283648 | A1 | 10/2017 | Mohara et al. | |

FOREIGN PATENT DOCUMENTS

| JP | 10-091936 A | 4/1998 |
| JP | 10-105950 A | 4/1998 |
| JP | 2008-534696 A | 8/2008 |
| JP | 2016-52779 A | 4/2016 |
| WO | 97/07155 A1 | 2/1997 |
| WO | WO 01/94446 A1 * | 12/2001 |
| WO | 2016/021408 A1 | 2/2016 |

OTHER PUBLICATIONS

Communication dated Jun. 24, 2020 from European Patent Office in EP Application No. 17882202.9.
International Preliminary Report on Patentability with the translation of Written Opinion dated Jun. 27, 2019, issued by the International Bureau in international application No. PCT/JP2017/042563.
Yanru Liu et al., "Photochemical grafting of fluorinate alkenes on DlG coated Ti6Al4V to improve in vitro cytocompatibility, friction and corrosion resistance", Surface & Coatings Technology, Aug. 8, 2012, pp. 51-56, vol. 208.
International Search Report for PCT/JP2017/042563, dated Jan. 16, 2018.

* cited by examiner

Primary Examiner — Tae H Yoon
(74) Attorney, Agent, or Firm — Sughrue Mion, PLLC

(57) ABSTRACT

An antifouling article including a base material, a diamond-like carbon layer and an antifouling coating layer formed of a surface-treating agent on the diamond-like carbon layer. The surface-treating agent includes a group having a carbon-carbon unsaturated bond, a group having a carbon-nitrogen unsaturated bond, or a leaving group.

19 Claims, No Drawings

ANTIFOULING ARTICLE

CROSS REFERENCE TO RELATED APPLICATIONS

This Application is a National Stage of International Application No. PCT/JP2017/042563 filed Nov. 28, 2017, claiming priority based on Japanese Patent Application No. 2016-241421 filed Dec. 13, 2016.

TECHNICAL FIELD

The present invention relates to an antifouling article, and more particularly to an antifouling article comprising a base material, a diamond-like carbon layer and an antifouling coating layer formed of a surface-treating agent comprising a fluorine-containing compound.

BACKGROUND ART

A certain fluorine-containing compound is known to be able to provide excellent water-repellency, oil-repellency and antifouling property, when it is used in a surface treatment of a base material. A layer obtained from a surface-treating agent containing a fluorine-containing compound (also referred to as a "surface-treating layer" hereinafter) is applied to various base materials such as glasses, plastics, fibers and building materials, as a so-called functional thin coating.

Known as such a fluorine-containing compound is a perfluoropolyether group-containing silane compound having a perfluoropolyether group in a molecular backbone and having a hydrolyzable group bonded to a Si atom at the molecular terminal or the terminal portion (see Patent Literatures 1 and 2). When a surface-treating agent containing this perfluoropolyether group-containing silane compound is applied to a base material, the hydrolyzable group bonded to a Si atom reacts with a Si—OH group of the base material and the hydrolyzable groups react with each other between the molecules of the compound to form a —Si—O—Si— bond, thereby obtaining a surface-treating layer.

Known as another fluorine-containing compound is a compound having a perfluoropolyether group or a perfluoroalkylene group in a molecular backbone and further containing —OH, —SH, —NR$^{11}$$_2$ (R$^{11}$ is a hydrogen atom or a lower alkyl group) or the like at the molecular terminal (Patent Literature 3). Patent Literature 3 discloses that such a fluorine-containing compound as above is used to form a surface-treating layer on a surface of a base material following diamond-like carbon.

CITATION LIST

Patent Literature

Patent Literature 1: JP 2008-534696 A
Patent Literature 2: International Publication No. WO 97/07155
Patent Literature 3: JP 2016-52779 A

SUMMARY OF INVENTION

Problem to be Solved by the Invention

However, the surface-treating layers disclosed in Patent Literatures 1 and 2 are each bonded to the base material by means of the —Si—O—Si— bond, and this bond is cleaved by hydrolysis, and durability may decrease in an acid or alkaline environment, particularly in an alkaline environment. Particularly this may be an especially conspicuous problem, when such a surface-treating layer is used in articles that are likely to be exposed to an acid or alkaline environment, for example, articles to which human sweat can attach (e.g., touch panels or the like).

The surface-treating layer disclosed in Patent Literature 3 is bonded to the base material through the diamond-like carbon layer by means of a —C—O— bond, a —C—N— bond, a —C—S— bond, etc., but has no —Si—O—Si— bond, and therefore, the layer has resistance to acids and alkalis. However, it has been found by the studies of the present inventors that an article having the surface-treating layer disclosed in Patent Literature 3 cannot sufficiently meet the gradually increasing demand for enhancement in friction durability.

It is an object of the present invention to provide a novel antifouling article having a surface-treating layer (that is, antifouling coating layer) having high resistance to acids and alkalis and having much higher friction durability.

Means to Solve the Problem

According to the aspect of the present invention, provided is an antifouling article comprising a base material, a diamond-like carbon layer and an antifouling coating layer formed of a surface-treating agent on the diamond-like carbon layer, wherein
the surface-treating agent comprises one or more fluorine-containing compounds represented by any of the following formulas (A1), (A2), (B1) and (B2):

(A1)

(A2)

(B1)

(B2)

wherein
A represents, each independently at each occurrence, a group having a carbon-carbon unsaturated bond, a group having a carbon-nitrogen unsaturated bond, or a leaving group;
Y represents, each independently at each occurrence, a single bond or a divalent organic group;
Rf represents, each independently, an alkyl group having 1 to 16 carbon atoms and optionally substituted by one or more fluorine atoms;
PFPE represents, each independently, —(OC$_6$F$_{12}$)$_a$—(OC$_5$F$_{10}$)$_b$—(OC$_4$F$_8$)$_c$—(OC$_3$F$_6$)$_d$—(OC$_2$F$_4$)$_e$—(OCF$_2$)$_f$—, wherein a, b, c, d, e and f are each independently an integer of not less than 0 and not more than 200, the sum of a, b, c, d, e and f is at least 1, and the order of presence of each repeating unit enclosed in parentheses and affixed with a, b, c, d, e or f is arbitrary in the formula;
X$^1$ represents, each independently, a single bond or a 2-10 valent organic group;
α is each independently at each occurrence, an integer of 1 to 9;
α' is each independently an integer of 1 to 9;
X$^2$ represents, each independently at each occurrence, a single bond or a 2-10 valent organic group;
β is each independently at each occurrence, an integer of 1 to 9;
β' is each independently an integer of 1 to 9;

$R^{91}$ represents a fluorine atom, —$CHF_2$ or —$CF_3$; and

Rf' represents, each independently at each occurrence, a perfluoroalkylene group having 1 to 20 carbon atoms.

Effect of the Invention

According to the present invention, a novel antifouling article having a surface-treating agent having resistance to acids and alkalis and further having good friction durability may be provided.

DESCRIPTION OF EMBODIMENTS

The antifouling article of the present invention is described hereinafter.

The antifouling article of the present invention comprises a base material, a diamond-like carbon layer and an antifouling coating layer.

The base material usable in the present invention is not limited, and for example, may be composed of any suitable materials, such as an inorganic material (e.g., glass, sapphire glass), a resin (natural or synthetic resins, e.g., common plastic materials, specifically acrylic resin, polycarbonate resin, etc.), a metal (simple metals such as aluminum, copper and iron, or composites such as alloys), a ceramic, a semiconductor (silicon, germanium, etc.), a fiber (woven fabric, nonwoven fabric, etc.), a fur, a leather, a wood, a pottery, a stone, and an architectural member or the like.

A preferred base material may be a glass or sapphire glass. Preferred examples of the glass include a soda-lime glass, an alkali aluminosilicate glass, a borosilicate glass, an alkali-free glass, a crystal glass and a quartz glass, and particularly preferred examples thereof include chemically strengthened soda-lime glass, chemically strengthened alkali aluminosilicate glass and chemically bonded borosilicate glass.

The shape of the base material is not limited. The surface region of the base material where the antifouling coating layer should be formed may be at least a part of the base material surface, and may be properly determined according to the use application of the article to be manufactured, the specifications thereof, etc.

On the surface (outermost layer) of the base material, another layer (or film) may be formed, and for example, a hard coat layer or an antireflection layer may be formed. The antireflection layer may be either a single antireflection layer or a multi antireflection layer. Examples of the inorganic material that may be used for the antireflection layer include $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$ and $WO_3$ and the like. These inorganic materials may be used alone or in combination of two or more (e.g., as a mixture). In the case of a multi antireflection layer, it is preferable to use $SiO_2$ and/or SiO for its outermost layer. When the article to be manufactured is an optical component for a touch panel, the article may have a transparent electrode, such as a thin coating using indium tin oxide (ITO), indium zinc oxide or the like, on a part of the surface of the base material (e.g., glass or sapphire glass). Further, the base material may have an insulating layer, an adhesive layer, a protecting layer, a decorated frame layer (I-CON), an atomized film layer, a hard coating layer, a polarizing film, a retardation film, a liquid crystal display module and the like according to the specifications of the article, etc.

The diamond-like carbon layer is located on the base material. The diamond-like carbon layer may be formed directly on the base material, or may be formed with another intervening layer described above, such as a hard coat layer or an antireflection layer.

In the present invention, the diamond-like carbon means carbon having an amorphous structure in which both bonds of a diamond bond (bond between carbons due to $sp^3$ hybrid orbital) and a graphite bond (bond between carbons due to $sp^2$ hybrid orbital) are mixed. The diamond-like carbon may contain atoms other than carbon, such as hydrogen, oxygen, silicon, nitrogen, aluminum, boron and phosphorus, and the like.

The thickness of the diamond-like carbon layer is not limited, and may be, for example, 1 nm to 100 μm, preferably 1 nm to 1000 nm, and more preferably 1 nm to 100 nm.

The diamond-like carbon layer may be formed, for example, by a chemical vapor deposition (CVD) method, such as a thermal CVD method or a plasma CVD method and the like, or a physical vapor deposition (PVD) method, such as a vacuum deposition method or a sputtering method and the like.

The diamond-like carbon layer has binding ability to the fluorine-containing compound contained in the surface-treating agent described below, and enhances hardness, frictional resistance, etc. of the article.

The antifouling coating layer is formed on the diamond-like carbon layer by using a surface-treating agent containing a fluorine-containing compound such as a perfluoropolyether group- or perfluoroalkyl group-containing compound.

The fluorine-containing compound is one or more compounds represented by any of the following formulas (A1), (A2), (B1) and (B2):

  (A1)

  (A2)

  (B1)

  (B2)

The fluorine-containing compound may be contained preferably at 0.1 to 100 parts by mass, and more preferably 10 to 50 parts by mass, with respect to 100 parts by mass of the surface-treating agent.

In one embodiment, one or more compounds represented by either formula (A1) or (B1) are contained as the fluorine-containing compounds. For example, the compound represented by formula (A1) is contained preferably at most 100 parts by mass, and more preferably not more than 90 parts by mass, with respect to 100 parts by mass of the total amount of the fluorine-containing compounds. The compound represented by formula (B1) is contained preferably at most 100 parts by mass, and more preferably not more than 90 parts by mass, with respect to 100 parts by mass of the above-described total amount. The surface-treating agent containing the fluorine-containing compound may contribute particularly to enhancement in resistance to acids and alkalis and friction durability of the antifouling coating layer.

In another embodiment, one or more compounds represented by any of the formulas (A1), (A2), (B1) and (B2) are contained as the fluorine-containing compounds. For example, the compound represented by formula (A1) is contained preferably in an amount of at most 99.9 parts by mass, and more preferably in an amount of not more than 90 parts by mass, based on 100 parts by mass of the total amount of the fluorine-containing compounds. The compound represented by formula (A2) is contained preferably in an amount of at most 50 parts by mass, and more preferably in an amount of not more than 20 parts by mass, based on 100 parts by mass of the above-described total amount. The compound represented by formula (B1) is contained preferably in an amount of at most 99.9 parts by mass, and more preferably in an amount of not more than 90 parts by mass, based on 100 parts by mass of the above-described total amount. The compound represented by formula (B2) is contained preferably in an amount of at most 50 parts by mass, and more preferably in an amount of not more than 20 parts by mass, based on 100 parts by mass of the above-described total amount.

The above formulas (A1), (A2), (B1) and (B2) are described below.

As used herein, a "2-10 valent organic group" represents a 2-10 valent group containing carbon. Examples of such 2-10 valent organic groups include, but not limited to, a 2-10 valent group obtained by further removing 1-9 hydrogen atoms from a hydrocarbon group. Examples of the divalent organic group include, but not limited to, a divalent group obtained by further removing one hydrogen atom from a hydrocarbon group.

As used herein, the "hydrocarbon group" represents a group containing carbon and hydrogen. Examples of such a hydrocarbon group include, but not limited to, a hydrocarbon group having 1 to 20 carbon atoms and optionally substituted by one or more substituents, such as an aliphatic hydrocarbon group and an aromatic hydrocarbon group, and the like. The "aliphatic hydrocarbon group" may be any of linear, branched and cyclic, and may be either saturated or unsaturated. The hydrocarbon group may contain one or more cyclic structures. Such a hydrocarbon group may have, at its end or in its molecular chain, one or more of N, O, S, Si, amide, sulfonyl, siloxane, carbonyl, carbonyloxy, etc.

As used herein, the substituent of the "hydrocarbon group" is not limited, and is, for example, one or more groups selected from a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5- to 10-membered heterocyclyl group, a 5- to 10-membered unsaturated heterocyclyl group, a $C_{6-10}$ aryl group and a 5- to 10-membered heteroaryl group, which is optionally substituted by one or more halogen atoms.

Formulas (A1) and (A2):

$(Rf\text{-}PFPE)_\alpha\text{-}X^1\text{—}(Y\text{-}A)_\alpha$      (A1)

$(A\text{-}Y)_\alpha\text{—}X^1\text{-}PFPE\text{-}X^1\text{—}(Y\text{-}A)_\alpha$      (A2)

In the formulas (A1) and (A2), Rf represents an alkyl group having 1 to 16 carbon atoms and optionally substituted by one or more fluorine atoms.

The "alkyl group having 1 to 16 carbon atoms" in the alkyl group having 1 to 16 carbon atoms and optionally substituted by one or more fluorine atoms may be linear or branched, and is preferably a linear or branched alkyl group having 1 to 6 carbon atoms, particularly 1 to 3 carbon atoms, and more preferably a linear alkyl group having 1 to 3 carbon atoms.

The Rf is preferably an alkyl group having 1 to 16 carbon atoms and substituted by one or more fluorine atoms, more preferably a $CF_2H\text{—}C_{1-15}$ fluoroalkylene group, and still more preferably a perfluoroalkyl group having 1 to 16 carbon atoms.

The perfluoroalkyl group having 1 to 16 carbon atoms may be linear or branched, and is preferably a linear or branched perfluoroalkyl group having 1 to 6 carbon atoms, particularly 1 to 3 carbon atoms, and more preferably a linear perfluoroalkyl group having 1 to 3 carbon atoms, specifically $—CF_3$, $—CF_2CF_3$ or $—CF_2CF_2CF_3$.

In the above formulas, PFPE is, each independently at each occurrence, a group represented by $—(OC_6F_{12})_a—(OC_5F_{10})_b—(OC_4F_8)_c—(OC_3F_6)_d(OC_2F_4)_e—(OCF_2)_f—$. PFPE corresponds to a perfluoro(poly)ether group. In the formula, a, b, c, d, e and f are each independently an integer of not less than 0 and not more than 200, and the sum of a, b, c, d, e and f is at least 1. Preferably, a, b, c, d, e and f are each independently an integer of not less than 0 and not more than 100. The sum of a, b, c, d, e and f is preferably not less than 5, and more preferably not less than 10, for example, not less than 10 and not more than 100. The order of presence of each repeating unit enclosed in parentheses and affixed with a, b, c, d, e or f is arbitrary in the formula.

These repeating units may be each linear or branched, but are each preferably linear. For example, $—(OC_6F_{12})—$ may be $—(OCF_2CF_2CF_2CF_2CF_2CF_2)—$, $—(OCF(CF_3)CF_2CF_2CF_2CF_2)—$, $—(OCF_2CF(CF_3)CF_2CF_2CF_2)—$, $—(OCF_2CF_2CF(CF_3) CF_2CF_2)—$, $—(OCF_2CF_2CF_2CF(CF_3) CF_2)—$, $(OCF_2CF_2CF_2CF_2CF(CF_3))—$ or the like, and is preferably $—(OCF_2CF_2CF_2CF_2CF_2CF_2)—$. $—(OC_5F_{10})—$ may be $—(OCF_2CF_2CF_2CF_2CF_2)—$, $—(OCF(CF_3)CF_2CF_2CF_2)—$, $—(OCF_2CF(CF_3) CF_2CF_2)—$, $—(OCF_2CF_2CF(CF_3) CF_2)—$, $—(OCF_2CF_2CF_2CF(CF_3))—$ or the like, and is preferably $—(OCF_2CF_2CF_2CF_2CF_2)—$. $—(OC_4F_8)—$ may be any of $—(OCF_2CF_2CF_2CF_2)—$, $—(OCF(CF_3) CF_2CF_2)—$, $—(OCF_2CF(CF_3)CF_2)—$, $—(OCF_2CF_2CF(CF_3))—$, $—(OC(CF_3)_2CF_2)—$, $—(OCF_2C(CF_3)_2)—$, $—(OCF(CF_3)CF(CF_3))—$, $—(OCF(C_2F_5)CF_2)—$ and $—(OCF_2CF(C_2F_5))—$, and is preferably $—(OCF_2CF_2CF_2CF_2)—$. $—(OC_3F_6)—$ may by any of $—(OCF_2CF_2CF_2)—$, $—(OCF(CF_3)CF_2)—$ and $—(OCF_2CF(CF_3))—$, and is preferably $—(OCF_2CF_2CF_2)—$. $—(OC_2F_4)—$ may be either $—(OCF_2CF_2)—$ or $—(OCF(CF_3))—$, and is preferably $—(OCF_2CF_2)—$.

In one embodiment, the PFPE is $—(OC_3F_6)_d—$ (wherein d is an integer of not less than 1 and not more than 200, preferably not less than 5 and not more than 200, and more preferably not less than 10 and not more than 200). Preferably, the PFPE is $—(OCF_2CF_2CF_2)_d—$ (wherein d is an integer of not less than 1 and not more than 200, preferably not less than 5 and not more than 200, and more preferably not less than 10 and not more than 200) or $—(OCF(CF_3) CF_2)_d—$ (wherein d is an integer of not less than 1 and not more than 200, preferably not less than 5 and not more than 200, and more preferably not less than 10 and not more than 200). More preferably, the PFPE is $—(OCF_2CF_2CF_2)_d—$ (wherein d is an integer of not less than 1 and not more than 200, preferably not less than 5 and not more than 200, and more preferably not less than 10 and not more than 200).

In another embodiment, the PFPE is $—(OC_4F_8)_c—(OC_3F_6)_d—(OC_2F_4)_e—(OCF_2)_f—$ (wherein c and d are each independently an integer of not less than 0 and not more than 30, e and f are each independently an integer of not less than 1 and not more than 200, preferably not less than 5 and not more than 200, and more preferably not less than 10 and not more than 200, and the order of presence of each repeating unit enclosed in parentheses and affixed with a subscript c, d, e or f is arbitrary in the formula). Preferably, the PFPE is $—(OCF_2CF_2CF_2CF_2)_c—(OCF_2CF_2CF_2)_d—(OCF_2CF_2)_e—(OCF_2)_f—$. In one embodiment, the PFPE may be $—(OC_2F_4)_e—(OCF_2)_f—$ (wherein e and f are each independently an integer of not less than 1 and not more than 200, preferably not less than 5 and not more than 200, and more preferably not less than 10 and not more than 200, and the order of presence of each repeating unit enclosed in parentheses and affixed with a subscript e or f is arbitrary in the formula).

In another embodiment, the PFPE is a group represented by $-(R^6-R^7)_j-$. In the formula, $R^6$ is $OCF_2$ or $OC_2F_4$, and is preferably $OC_2F_4$. In the formula, $R^7$ is a group selected from $OC_2F_4$, $OC_3F_6$, $OC_4F_8$, $OC_5F_{10}$ and $OC_6F_{12}$, or is a combination of two or three groups independently selected from these groups. Preferably, $R^7$ is a group selected from $OC_2F_4$, $OC_3F_6$ and $OC_4F_8$, or is a group selected from $OC_3F_6$, $OC_4F_8$, $OC_5F_{10}$ and $OC_6F_{12}$, or is a combination of two or three groups independently selected from these groups. Examples of the combination of two or three groups independently selected from $OC_2F_4$, $OC_3F_6$ and $OC_4F_8$ include, but not limited to, $-OC_2F_4OC_3F_6-$, $-OC_2F_4OC_4F_8-$, $-OC_3F_6OC_2F_4-$, $-OC_3F_6OC_3F_6-$, $-OC_3F_6OC_4F_8-$, $-OC_4F_8OC_4F_8-$, $-OC_4F_8OC_3F_6-$, $-OC_4F_8OC_2F_4-$, $-OC_2F_4OC_2F_4OC_3F_6-$, $-OC_2F_4OC_2F_4OC_4F_8-$, $-OC_2F_4OC_3F_6OC_2F_4-$, $-OC_2F_4OC_3F_6OC_3F_6-$, $-OC_2F_4OC_4F_8OC_2F_4-$, $-OC_3F_6OC_2F_4OC_2F_4-$, $-OC_3F_6OC_2F_4OC_3F_6-$, $-OC_3F_6OC_3F_6OC_2F_4-$ and $-OC_4F_8OC_2F_4OC_2F_4-$. The j is an integer of 2 to 100, and preferably an integer of 2 to 50. In the above formula, $OC_2F_4$, $OC_3F_6$, $OC_4F_8$, $OC_5F_{10}$ and $OC_6F_{12}$ may be each either linear or branched, and is preferably linear. In this embodiment, the PFPE is preferably $-(OC_2F_4-OC_3F_6)_j-$ or $-(OC_2F_4-OC_4F_8)_j-$.

In the above embodiment, the j is not less than 2, preferably not less than 3, and more preferably not less than 5, and may be an integer of not more than 100, and preferably not more than 50.

In the PFPE, the ratio of e to f (referred to as "e/f ratio" hereinafter) is not less than 0.1 and not more than 10, preferably not less than 0.2 and not more than 5, more preferably not less than 0.2 and not more than 2, still more preferably not less than 0.2 and not more than 1.5, and much more preferably not less than 0.2 and not more than 0.85. By specifying the e/f ratio to not more than 10, the lubricity, friction durability and chemical resistance (e.g., durability to artificial sweat) of an antifouling coating layer obtained from this compound are more enhanced. As the e/f ratio decreases, the lubricity and friction durability of the antifouling coating layer are more enhanced. On the other hand, by specifying the e/f ratio to not less than 0.1, the stability of the compound may be more enhanced. As the e/f ratio increases, the stability of the compound is more enhanced.

The number-average molecular weight of the Rf-PFPE-moiety or the -PFPE-moiety is, but not limited to, 500 to 30,000, preferably 1,000 to 20,000, more preferably 2,000 to 15,000, and still more preferably 2,000 to 10,000. The number-average molecular weight is defined as a value measured by $^{19}F$-NMR.

In another embodiment, the number-average molecular weight of the Rf-PFPE-moiety or the -PFPE-moiety may be 4,000 to 30,000, and preferably 5,000 to 10,000.

In another embodiment, the number-average molecular weight of the Rf-PFPE-moiety or the -PFPE-moiety may be 2,000 to 10,000, and preferably 2,000 to 5,000.

The each $X^1$ independently represents a single bond or a 2-10 valent organic group. The $X^1$ is recognized as a linker which connects between the perfluoropolyether moiety (Rf-PFPE-moiety or -PFPE-moiety) mainly providing water-repellency, surface lubricity and the like, and a moiety having binding ability to the diamond-like carbon layer (specifically, $-Y-A$) in the compounds represented by the formulas (A1) and (A2). Accordingly, the $X^1$ may be any organic group as long as the compounds represented by the formulas (A1) and (A2) can stably exist.

In the above formulas, α is an integer of 1 to 9, and α' is an integer of 1 to 9. These α and α' are determined depending on the valence of $X^1$, and in formula (A1), the sum of α and α' is a value of the valence of $X^1$. For example, when $X^1$ is a 10 valent organic group, the sum of α and α' is 10, and for example, α is 9 and α' is 1, or α is 5 and α' is 5, or α is 1 and α' is 9. When $X^1$ is a divalent organic group, α and α' are each 1. In formula (A2), α is a value obtained by subtracting 1 from the value of the valence of $X^1$.

The $X^1$ is preferably a 2-7 valent organic group, more preferably a 2-4 valent organic group, and still more preferably a divalent organic group.

In one embodiment, $X^1$ is a 2-4 valent organic group, α is 1 to 3, and α' is 1.

In another embodiment, $X^1$ is a divalent organic group, α is 1, and α' is 1.

Examples of the $X^1$ include, but not limited to, divalent groups represented by the following formula:

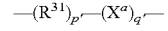

wherein $R^{31}$ represents a single bond, $-(CH_2)_{s'}-$ or an o-, m- or p-phenylene group, and preferably $-(CH_2)_{s'}-$;

s' is an integer of 1 to 20, preferably an integer of 1 to 6, more preferably an integer of 1 to 3, and still more preferably 1 or 2;

$X^a$ represents $-(X^b)_{l'}-$;

$X^b$ represents, each independently at each occurrence, a group selected from the group consisting of $-O-$, $-S-$, an o-, m- or p-phenylene group, $-C(O)O-$, $-Si(R^{33})_2-$, $-(Si(R^{33})_2O)_{m'}-Si(R^{33})_2-$, $-CONR^{34}-$, $-O-CONR^{34}-$, $-NR^{34}-$ and $-(CH_2)_{n'}-$;

$R^{33}$ represents, each independently at each occurrence, a phenyl group, a $C_{1-6}$ alkyl group or a $C_{1-6}$ alkoxy group, preferably a phenyl group or a $C_{1-6}$ alkyl group, and more preferably a methyl group;

$R^{34}$ represents, each independently at each occurrence, a hydrogen atom, a phenyl group or a $C_{1-6}$ alkyl group (preferably, a methyl group);

m' is each occurrence at each occurrence an integer of 1 to 100, and preferably an integer of 1 to 20;

n' is each occurrence at each occurrence an integer of 1 to 20, preferably an integer of 1 to 6, and more preferably an integer of 1 to 3;

l' is an integer of 1 to 10, preferably an integer of 1 to 5, and more preferably an integer of 1 to 3;

p' is 0 or 1;

q' is 0 or 1; and at least one of p' and q' is 1, and the order of presence of each repeating unit enclosed in parentheses and affixed with p' or q' is arbitrary. Here, $R^{31}$ and $X^a$ (typically, hydrogen atoms of $R^{31}$ and $X^a$) are optionally substituted by one or more substituents selected from a fluorine atom, a $C_{1-3}$ alkyl group and a $C_{1-3}$ fluoroalkyl group.

Preferably, the $X^1$ is $-(R^{31})_{p'}-(X^a)_{q'}-R^{32}-$. $R^{32}$ represents a single bond, $-(CH_2)_{t'}-$ or an o-, m- or p-phenylene group, and is preferably $-(CH_2)_{t'}-$. t' is an integer of 1 to 20, preferably an integer of 2 to 6, and more preferably an integer of 2 to 3. Here, $R^{32}$ (typically, hydrogen atom of $R^{32}$) is optionally substituted by one or more substituents selected from a fluorine atom, a $C_{1-3}$ alkyl group and a $C_{1-3}$ fluoroalkyl group.

Preferably, the $X^1$ is
a $C_{1-20}$ alkylene group,
—$R^{31}$—$X^c$—$R^{32}$— or
—$X^d$—$R^{32}$—
wherein $R^{31}$ and $R^{32}$ are as defined above.

More preferably, the $X^1$ is
a $C_{1-20}$ alkylene group,
—$(CH_2)_{s'}$—$X^c$—,
—$(CH_2)_{s'}$—$X^c$—$(CH_2)_{t'}$—
—$X^d$—, or
—$X^d$—$(CH_2)_{t'}$—
wherein s' and t' are as defined above.

In the above formulas, $X^c$ represents
—O—,
—S—,
—C(O) O—,
—$CONR^{34}$—,
—O—$CONR^{34}$—,
—$Si(R^{33})_2$—,
—$(Si(R^{33})_2O)_{m'}$—$Si(R^{33})_2$—,
—O—$(CH_2)_{u'}$—$(Si(R^{33})_2O)_{m'}$—$Si(R^{33})_2$—,
—O—$(CH_2)_{u'}$—$Si(R^{33})_2$—O—$Si(R^{33})_2$—$CH_2CH_2$—Si$(R^{33})_2$—O—$Si(R^{33})_2$—,
—O—$(CH_2)_{u'}$—$Si(OCH_3)_2OSi(OCH_3)_2$—,
—$CONR^{34}$—$(CH_2)_{u'}$—$(Si(R^{33})_2O)_{m'}$—$Si(R^{33})_2$—,
—$CONR^{34}$—$(CH_2)_{u'}$—$N(R^{34})$—, or
—$CONR^{34}$-(o-, m- or p-phenylene)-$Si(R^{33})_2$—
wherein $R^{33}$, $R^{34}$ and m' are as defined above; and
u' is an integer of 1 to 20, preferably an integer of 2 to 6, and more preferably an integer of 2 to 3. $X^c$ is preferably —O—.

In the above formulas, $X^d$ is
—S—,
—C(O)O—,
—$CONR^{34}$—,
—$CONR^{34}$—$(CH_2)_{u'}$—$(Si(R^{33})_2O)_{m'}$—$Si(R^{33})_2$—,
—$CONR^{34}$—$(CH_2)_{u'}$—$N(R^{34})$—, or
—$CONR^{34}$-(o-, m- or p-phenylene)-$Si(R^{33})_2$—
wherein each symbol is as defined above.

More preferably, the $X^1$ is
a $C_{1-20}$ alkylene group,
—$(CH_2)_{s'}$—$X^c$—$(CH_2)_{t'}$—, or
—$X^d$—$(CH_2)_{t'}$—
wherein each symbol is as defined above.

Still more preferably, the $X^1$ is
a $C_{1-20}$ alkylene group,
—$(CH_2)_{s'}$—O—$(CH_2)_{t'}$—,
—$(CH_2)_{s'}$—O—$(Si(R^{33})_2O)_{m'}$—$Si(R^{33})_2$—$(CH_2)_{t'}$—,
—$(CH_2)_{s'}$—O—$(CH_2)_{u'}$—$(Si(R^{33})_2O)_{m'}$—$Si(R^{33})_2$—$(CH_2)_{t'}$—, or
—$(CH_2)_{s'}$—O—$(CH_2)_{t'}$—$Si(R^{33})_2$—$(CH_2)_{u'}$—$Si(R^{33})_2$—$(C_vH_{2v})$—
wherein $R^{33}$, m', s', t' and u' are as defined above, and v is an integer of 1 to 20, preferably an integer of 2 to 6, and more preferably an integer of 2 to 3.

In the above formula, —$(C_vH_{2v})$— may be linear or branched, and may be, for example, —$CH_2CH_2$—, —$CH_2CH_2CH_2$—, —$CH(CH_3)$—, or —$CH(CH_3)CH_2$—.

The $X^1$ group is optionally substituted by one or more substituents selected from a fluorine atom, a $C_{1-3}$ alkyl group and a $C_{1-3}$ fluoroalkyl group (preferably, $C_{1-3}$ perfluoroalkyl group).

In one embodiment, the $X^1$ group may be a group other than an —O—$C_{1-6}$ alkylene group.

In another embodiment, examples of the $X^1$ group include the following groups:

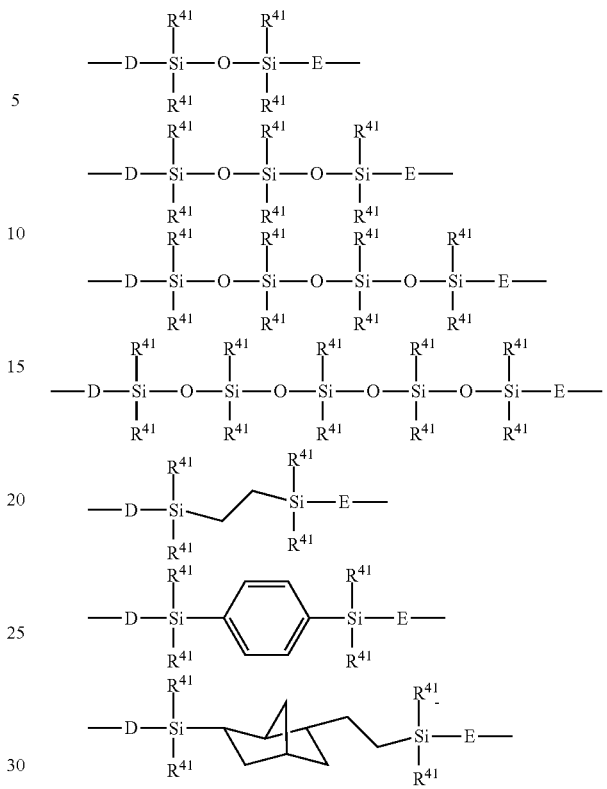

wherein $R^{41}$ is each independently a hydrogen atom, a phenyl group, an alkyl group having 1 to 6 carbon atoms, or a $C_{1-6}$ alkoxy group, and is preferably a methyl group;

D is a group selected from
—$CH_2O(CH_2)_2$—,
—$CH_2O(CH_2)_3$—,
—$CF_2O(CH_2)_3$—,
—$(CH_2)_2$—,
—$(CH_2)_3$—,
—$(CH_2)_4$—,
—$CONH$—$(CH_2)_3$—,
—$CON(CH_3)$—$(CH_2)_3$—
—$CON(Ph)$-$(CH_2)_3$— (wherein Ph means phenyl), and

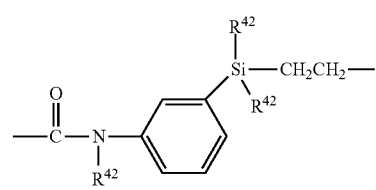

wherein $R^{42}$ represents, each independently, a hydrogen atom, a $C_{1-6}$ alkyl group or a $C_{1-6}$ alkoxy group, preferably a methyl group or a methoxy group, and more preferably a methyl group;

E is —$(CH_2)_{ne}$— (ne is an integer of 1 to 6);

D is bonded to PFPE of the molecular backbone; and E is bonded to a group opposite to PFPE.

Specific examples of the $X^1$ include:
—$CH_2O(CH_2)_2$—,
—$CH_2O(CH_2)_3$—,
—$CH_2O(CH_2)_6$—, —CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—(CH$_2$)$_2$—,
—(CH$_2$)$_3$—,
—(CH$_2$)$_4$—,
—(CH$_2$)$_5$—,
—(CH$_2$)$_6$—,
—CO—,
—CONH—,
—CONH—CH$_2$—,
—CONH—(CH$_2$)$_2$—,
—(CH$_2$)$_2$—Si(CH$_3$)$_2$—(CH$_2$)$_2$—,
—CONH—(CH$_2$)$_3$—,
—CON(CH$_3$)—(CH$_2$)$_3$—,
—CON(Ph)-(CH$_2$)$_3$— (wherein Ph means phenyl),
—CONH—(CH$_2$)$_6$—,
—CON(CH$_3$)—(CH$_2$)$_6$—,
—CON(Ph)-(CH$_2$)$_6$— (wherein Ph means phenyl),
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

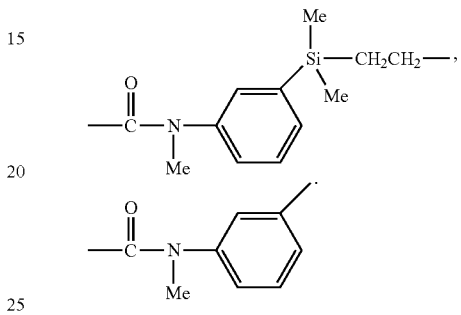

In another embodiment, X$^1$ is a group represented by the formula: —(R$^{16}$)$_x$—(CFR$^{17}$)$_y$—(CH$_2$)$_z$—. In this formula, x, y and z are each independently an integer of 0 to 10, the sum of x, y and z is not less than 1, and the order of presence of each repeating unit enclosed in parentheses is arbitrary in the formula.

In the above formula, R$^{16}$ is each independently at each occurrence an oxygen atom, phenylene, carbazolylene, —NR$^{18}$— (wherein R$^{18}$ is a hydrogen atom or an organic group) or a divalent organic group. Preferably, R$^{16}$ is an oxygen atom or a divalent polar group.

Examples of the "divalent polar group" include, but not limited to, —C(O)—, —C(=NR$^{19}$)— and —C(O)NR$^{19}$— (in these formulas, R$^{19}$ represents a hydrogen atom or a lower alkyl group). Examples of the "lower alkyl group" include alkyl groups having 1 to 6 carbon atoms, such as methyl, ethyl and n-propyl, and these are optionally substituted by one or more fluorine atoms.

In the above formula, R$^{17}$ is each independently at each occurrence a hydrogen atom, a fluorine atom or a lower fluoroalkyl group, and is preferably a fluorine atom. The "lower fluoroalkyl group" is, for example, a fluoroalkyl group having 1 to 6 carbon atoms, preferably having 1 to 3 carbon atoms, preferably a perfluoroalkyl group having 1 to 3 carbon atoms, more preferably a trifluoromethyl group or a pentafluoroethyl group, and still more preferably a trifluoromethyl group.

In this embodiment, X$^1$ is preferably a group represented by the formula: —(O)$_x$—(CF$_2$)$_y$—(CH$_2$)$_z$— (wherein x, y and z are as defined above, and the order of presence of each repeating unit enclosed in parentheses is arbitrary in the formula).

Examples of the group represented by the above formula: —(O)$_x$—(CF$_2$)$_y$—(CH$_2$)$_z$— include groups represented by —(O)$_{x'}$—(CH$_2$)$_{z''}$—O—[(CH$_2$)$_{z'''}$—O—]$_{z''''}$ and —(O)$_{x'}$—(CF$_2$)$_{y''}$—(CH$_2$)$_{z''}$—O—[(CH$_2$)$_{z'''}$—O—]$_{z''''}$ (wherein x' is 0 or 1, y", z" and z''' are each independently an integer of 1 to 10, and z'''' is 0 or 1). The left ends of these groups are each bonded to the PFPE side.

In another preferred embodiment, X$^1$ is —O—CFR$^{20}$—(CF$_2$)$_e$—.

The each $R^{20}$ represents, each independently, a fluorine atom or a lower fluoroalkyl group. Here, the lower fluoroalkyl group is, for example, a fluoroalkyl group having 1 to 3 carbon atoms, preferably a perfluoroalkyl group having 1 to 3 carbon atoms, more preferably a trifluoromethyl group or a pentafluoroethyl group, and still more preferably a trifluoromethyl group.

The each e' is independently 0 or 1.

In one specific embodiment, $R^{20}$ is a fluorine atom, and e' is 1.

In another embodiment, examples of the $X^1$ group include the following groups:

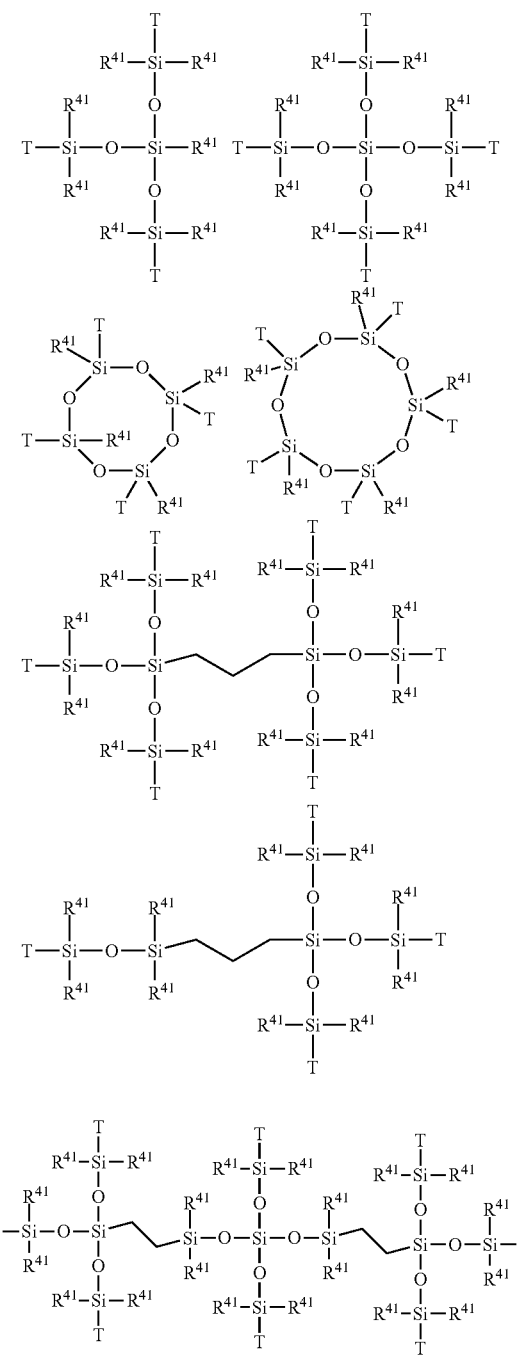

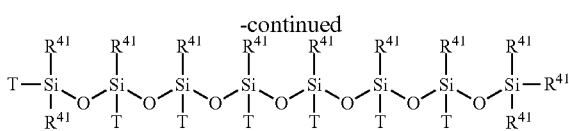

wherein
each $R^{41}$ is independently a hydrogen atom, a phenyl group, an alkyl group having 1 to 6 carbon atoms or a $C_{1-6}$ alkoxy group, and preferably a methyl group;
in each $X^1$ group, some arbitrary Ts are each the following group which bonds to PFPE of the main molecular backbone:
—CH$_2$O(CH$_2$)$_2$—,
—CH$_2$O(CH$_2$)$_3$—,
—CF$_2$O(CH$_2$)$_3$—,
—(CH$_2$)$_2$—,
—(CH$_2$)$_3$—,
—(CH$_2$)$_4$—,
—CONH—(CH$_2$)$_3$—,
—CON(CH$_3$)—(CH$_2$)$_3$—,
—CON(Ph)-(CH$_2$)$_3$— (wherein Ph means phenyl), or

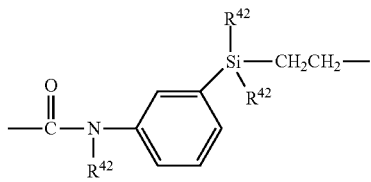

wherein $R^{42}$ represents, each independently, a hydrogen atom, a $C_{1-6}$ alkyl group or a $C_{1-6}$ alkoxy group, preferably a methyl group or a methoxy group, and more preferably a methyl group,
some other Ts are each —(CH$_2$)$_{n''}$— (n" is an integer of 2 to 6) bonded to a group opposite to PFPE of the main molecular backbone (that is, Y in the formulas (A1) and (A2)), and the residual Ts, if present, are each independently a methyl group, a phenyl group, a $C_{1-6}$ alkoxy group, a radical scavenging group, or an ultraviolet ray absorbing group.

The radical scavenging group is not limited as long as it can scavenge radicals generated by light irradiation, and examples thereof include residues of benzophenones, benzotriazoles, benzoates, phenyl salicylates, crotonic acids, malonates, organoacrylates, hindered amines, hindered phenols, and triazines.

The ultraviolet ray absorbing group is not limited as long as it can absorb ultraviolet light, and examples thereof include residues of benzotriazoles, hydroxybenzophenones, esters of substituted or unsubstituted benzoic acid or salicylic acid compounds, acrylates or alkoxycinnamates, oxamides, oxanilides, benzoxazinones and benzoxazoles.

In a preferable embodiment, a preferable radical scavenging group or ultraviolet ray absorbing group is, for example,

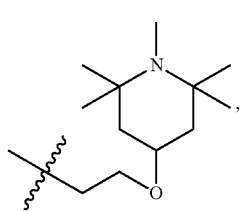

-continued

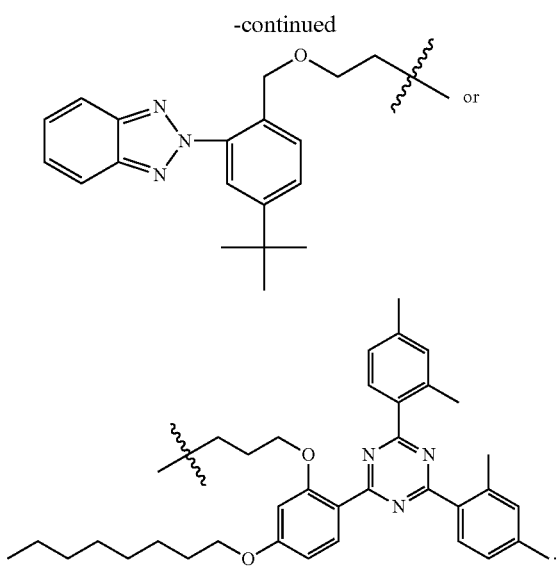

In this embodiment, $X^1$ may be each independently a 3-10 valent organic group.

The Y represents, each independently at each occurrence, a single bond or a divalent organic group. Preferably, Y may be a single bond or a hydrocarbon group (preferably, an optionally substituted $C_{1-6}$ alkylene group).

The A represents, each independently at each occurrence, a group having a carbon-carbon unsaturated bond, a group having a carbon-nitrogen unsaturated bond, or a leaving group.

As described above, the diamond-like carbon has a diamond bond (bond between carbons due to $sp^3$ hybrid orbital) and a graphite bond (bond between carbons due to $sp^2$ hybrid orbital). It is considered that in the case of a surface-treating agent containing a fluorine compound containing —OH, —SH, —NR$^{11}_2$ is a hydrogen atom or a lower alkyl group) or the like, the diamond-like carbon layer and the fluorine-containing compound are bonded to each other by means of a —C—O— bond, a —C—S— bond, a —C—N— bond or the like. These bonds are considered to be bonds to a portion having the $sp^2$ hybrid orbital of the diamond-like carbon.

On the other hand, it is considered that in the case of the fluorine-containing compound used for forming a surface-treating layer (antifouling coating layer) of the article of the present invention, a carbon atom contained in the group having a carbon-carbon unsaturated bond (more specifically, a carbon atom having constituted the carbon-carbon unsaturated bond) or a carbon atom bonded to a leaving group is bonded to the diamond-like carbon. The antifouling coating layer of the article of the present invention has resistance to acids and alkalis equivalent to that in the case where such a surface-treating agent having —OH, —SH, —NR$^{11}_2$ or the like as described above is used, and further has better friction durability. In the present invention, it is considered that the diamond-like carbon layer and the fluorine-containing compound are bonded through not only the $sp^2$ hybrid orbital but also the $sp^3$ hybrid orbital of the diamond-like carbon, and it is considered that consequently, the bonding becomes stronger, and not only the resistance to acids and alkalis but also the frictional resistance are improved.

The group having a carbon-carbon unsaturated bond has at least one carbon-carbon unsaturated bond, and preferably has one carbon-carbon unsaturated bond. The carbon-carbon unsaturated bond is preferably present at an end part of a molecular chain of the fluorine-containing compound. The carbon-carbon unsaturated bond is, for example, a double bond or a triple bond, and is preferably a double bond.

The group having a carbon-carbon unsaturated bond preferably contains 2 to 20 carbon atoms, more preferably contains 2 to 12 carbon atoms, and still more preferably contains 2 to 6 carbon atoms.

The group having a carbon-carbon unsaturated bond is, for example, an aliphatic hydrocarbon group or an aromatic hydrocarbon group, and is particularly an aliphatic hydrocarbon group. The group having a carbon-carbon unsaturated bond may be any of linear, branched and cyclic, and is, for example, linear or branched. The group having a carbon-carbon unsaturated bond may contain one or more cyclic structures. For example, the group having a carbon-carbon unsaturated bond is an alkenyl group having 2 to 6 carbon atoms and having a carbon-carbon double bond at an end.

The group having a carbon-carbon unsaturated bond is optionally substituted by one or more substituents. The substituent is preferably a halogen atom (e.g., fluorine atom, chlorine atom, bromine atom or iodine atom, particularly fluorine atom or chlorine atom, more specifically fluorine atom), is more preferably a chlorine atom or a fluorine atom, and is particularly preferably a fluorine atom.

The group having a carbon-carbon unsaturated bond may have, for example, one or more of N, O, S, Si, amide, sulfonyl, siloxane, carbonyl, carbonyloxy and the like in its molecular chain, and may particularly have O (oxygen atom) and amide.

Examples of the group having a carbon-carbon unsaturated bond include a vinyl group, a propylene group, a 1-propenyl group, a 2-propenyl group, an isopropenyl group; an ethynyl group, a propynyl group; an allyl ether group ($CH_2$=CH—$CH_2$—O—), an acrylic group ($CH_2$=CH—CO—O—), an acrylamide group ($CH_2$=CH—CO—NH—), and an allyl ester group ($CH_2$=CH—O—CO—). The group having a carbon-carbon unsaturated bond is preferably an allyl ether group, a propylene group or a vinyl group, and is more preferably an allyl ether group or a propylene group.

Examples of the group having a carbon-nitrogen unsaturated bond include a cyano group (NC—), an oxime derivative group ($R_n$—O—N=C—) [$R_n$: proton, alkyl group, acyl group, acryloyl group, propargyl group, mesyl group, sulfonyl group, phosphoric acid group, tosyl group], a nitro group ($O_2N$—C—), and an isocyanate group (O=N=C—). The group having a carbon-nitrogen unsaturated bond is preferably a cyano group (NC—), a sulfonyloxime group (e.g., Me-$SO_2$—O—N=C—), a nitro group ($O_2N$=C—) or an isocyanate group (O=N=C—), and is more preferably a cyano group (NC—), a nitro group ($O_2N$=C—) or an isocyanate group (O=N=C—).

It is preferable that the carbon-nitrogen unsaturated bond be present at an end part of a molecular chain of the fluorine-containing compound.

The leaving group is preferably at least one selected from the group consisting of a functional group containing a metal atom, a halogen atom and an anionic leaving group. As used herein, the leaving group is a group $A_1$ directly bonded to a carbon atom capable of taking in an electron pair of a C-$A_1$ bond and thereby easily leaving. In particular, the leaving group is preferably a group having high leaving ability, and is preferably a functional group capable of being substituted by a nucleophile in the SN2 reaction. The leaving group is preferably a functional group having a dissociation constant (pKa) of not more than 30, and is more preferably a functional group having a dissociation constant of not more than 10. The dissociation constant is a value measured at 25 degrees in dimethyl sulfoxide.

Examples of the functional group containing a metal atom include a trimethylsilyl group, a titanium alkoxide group and a titanium acylate group.

In one embodiment, the functional group containing a metal atom is a functional group containing a transition metal.

Examples of the halogen atom include a bromine atom and an iodine atom, and particularly from the viewpoint of good leaving ability, the halogen atom is an iodine atom.

The anionic leaving group is, for example, a sulfur derivative having a structure of $R_sOSO_3^-$ or $R_sSO_3^-$ (wherein $R_s$ represents an optionally substituted hydrocarbon group having 1 to 12 carbon atoms, and examples of the substituent include a fluorine atom and a chlorine atom). Specific examples of the functional group having such a structure as above include a methyl sulfate ion ($CH_3OSO_3^-$), a methanesulfonate ion (mesylate ion) ($CH_3SO_3^-$), a trifluoromethanesulfonate ion (triflate ion) ($CF_3SO_3^-$), and a 4-methylbenzenesulfonate ion (p-toluenesulfonate ion, tosylate ion) and the like.

It is preferable that the leaving group be present at an end part of a molecular chain of the fluorine-containing compound.

In one embodiment, when A is a leaving group, Y is a $C_{1-6}$ alkylene group optionally substituted by one or more substituents. The substituent is, for example, a halogen atom (e.g., fluorine atom, chlorine atom, particularly fluorine atom). Y is preferably a perfluoroalkylene group.

The number-average molecular weight of the compound represented by the formulas (A1) and (A2) is not limited, and may be, for example, 1,000 to 40,000, preferably 2,000 to 32,000, more preferably 2,000 to 20,000, and still more preferably 2,500 to 12,000. The number-average molecular weight is a value measured by $^{19}$F-NMR and $^1$H-NMR.

In one embodiment, the weight-average molecular weight Mw of the compound represented by the formulas (A1) and (A2) is not less than 3000 but less than 6000, and the molecular weight distribution (Mw/Mn) of the compounds is not more than 1.2. The weight-average molecular weight and the molecular weight distribution are determined based on, for example, GPC (gel permeation chromatography) measurement.

The compound represented by the formulas (A1) and (A2) may be obtained by, for example, using a perfluoropolyether derivative corresponding to the Rf-PFPE-moiety as a starting material, introducing hydroxyl group into the end, and thereafter subjecting the derivative and a compound having a group corresponding to the —Y-A moiety, such as an alkyl halide, at the end to Williamson reaction.

Alternatively, the above compound may be produced by synthesizing a compound with a precursor group instead of the Y-A moiety and converting this precursor group into the Y-A group by a method known in this art.

Formulas (B1) and (B2):

  (B1)

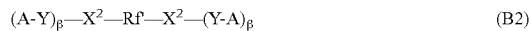  (B2)

In the formulas (B1) and (B2), Y and A are as defined for the formulas (A1) and (A2).

In the above formulas, $X^2$ represents, each independently, a single bond or a 2-10 valent organic group. The $X^2$ is recognized as a linker which connects between the fluoroalkyl moiety ($R^{91}$—Rf— or —Rf— moiety), mainly providing water-repellency and the like, and a group having binding ability to the base material (specifically A group or group having A group) in the compounds represented by the formulas (B1) and (B2). Accordingly, the $X^2$ may be any organic group as long as the compounds represented by formulas (B1) and (B2) can stably exist.

In the above formulas, β is an integer of 1 to 9, and β' is an integer of 1 to 9. These β and β' are determined depending on the valence of $X^2$, and in formula (B1), the sum of β and β' is a value of the valence of $X^2$. For example, when $X^2$ is a 10 valent organic group, the sum of β and β' is 10, and for example, β is 9 and β' is 1, or β is 5 and β' is 5, or β is 1 and β' is 9. When $X^2$ is a divalent organic group, β and β' are each 1. In formula (B2), β is a value obtained by subtracting 1 from the value of the valence of $X^2$.

The $X^2$ is preferably a 2-7 valent organic group, more preferably a 2-4 valent organic group, and still more preferably a divalent organic group.

Examples of the $X^2$ include, but not limited to, the same ones as described with regard to the $X^1$. However, in the description with regard to $X^1$, "PFPE" is replaced with "Rf".

In the above formula, $R^{91}$ represents a fluorine atom, —$CHF_2$ or —$CF_3$, and is preferably a fluorine atom or —$CF_3$.

Rf' represents a perfluoroalkylene group having 1 to 20 carbon atoms. Rf' preferably has 1 to 12 carbon atoms, more preferably has 1 to 6 carbon atoms, and still more preferably has 3 to 6 carbon atoms. Specific examples of Rf' include —$CF_2$—, —$CF_2CF_2$—, —$CF_2CF_2CF_2$—, —$CF(CF_3)$—, —$CF_2CF_2CF_2CF_2$—, —$CF_2CF(CF_3)$—, —$C(CF_3)_2$—, —$(CF_2)_4CF_2$—, —$(CF_2)_2CF(CF_3)$—, —$CF_2C(CF_3)_2$—, —$CF(CF_3)CF_2CF_2CF_2$—, —$(CF_2)_5CF_2$—, —$(CF_2)_3CF(CF_3)$—, —$(CF_2)_4CF(CF_3)$—, —$C_8F_{16}$—, and of these, linear perfluoroalkylene having 3 to 6 carbon atoms, for example, —$CF_2CF_2CF_2CF_2$— or —$CF_2CF_2CF_2$—, is preferable.

The compound represented by the formulas (B1) and (B2) may be obtained by, for example, using a fluoroalkyl derivative corresponding to the $R^{91}$—Rf'— moiety as a starting material, introducing a hydroxyl group into the end, and thereafter subjecting the derivative and a group corresponding to the —Y-A moiety, such as a compound having an alkyl halide at the end, to Williamson reaction.

Alternatively, the above compound can be produced by synthesizing a compound with a precursor group instead of the Y-A moiety and converting this precursor group into the Y-A group by a method known in this art.

In a preferred embodiment, the fluorine-containing compound is one or more compounds represented by either formula (A1) or formula (A2). More preferably, the fluorine-containing compound is one or more compounds represented by formula (A1).

In another preferred embodiment, the fluorine-containing compound is one or more compounds represented by either formula (B1) or formula (B2). More preferably, the fluorine-containing compound is one or more compounds represented by formula (B1).

The surface-treating agent used for forming the antifouling coating layer may have been diluted with a solvent. Such a solvent is not limited, and is, for example, a solvent selected from the group consisting of perfluorohexane, $CF_3CF_2CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluorocyclopentane (ZEORORA-H (trade name) or the like), $C_4F_9OCH_3$, $C_4F_9OC_2H_5$, $CF_3CH_2OCF_2CHF_2$, $C_6F_{13}CH=CH_2$, xylene hexafluoride, perfluorobenzene, methyl pentadecafluoroheptyl ketone, trifluoroethanol, pentafluoropropanol, hexafluoroisopropanol, HCF$_2$CF$_2$CH$_2$OH, methyl trifluoromethanesulfonate, trifluoroacetic acid and CF$_3$O(CF$_2$CF$_2$O)$_m$(CF$_2$O)$_n$CF$_2$CF$_3$[wherein m and n are each independently an integer of not less than 0 and not more than 1000, and the order of presence of each repeating unit enclosed in parentheses and affixed with m or n is arbitrary in the formula, provided that the sum of m and n is not less than 1], 1,1-dichloro-2,3,3,3-tetrafluoro-1-propene, 1,2-dichloro-1,3,3,3-tetrafluoro-1-propene, 1,2-dichloro-3,3,3-trifluoro-1-propene, 1,1-dichloro-3,3,3-trifluoro-1-propene, 1,1,2-trichloro-3,3,3-trifluoro-1-propene, and 1,1,1,4,4,4-hexafluoro-2-butene. These solvents can be used alone or as a mixture of two or more.

The surface-treating agent used for forming the antifouling coating layer may contain other components in addition to the fluorine-containing compound. Examples of such other component include, but not limited to, an (unreactive) fluoropolyether compound that can be understood as a fluorine-containing oil, preferably a perfluoro(poly)ether compound (referred to as a "fluorine-containing oil" hereinafter), an (unreactive) silicone compound that can be understood as a silicone oil (referred to as a "silicone oil" hereinafter), and a catalyst, and the like.

Examples of the fluorine-containing oil include, but not limited to, a compound represented by the following general formula (3) (perfluoro(poly)ether compounds).

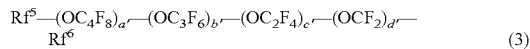
$$Rf^5-(OC_4F_8)_{a'}-(OC_3F_6)_{b'}-(OC_2F_4)_{c'}-(OCF_2)_{d'}-Rf^6 \quad (3)$$

wherein Rf$^5$ represents an alkyl group having 1 to 16 carbon atoms and optionally substituted by one or more fluorine atoms (preferably, C$_{1-16}$ perfluoroalkyl group), Rf$^6$ represents an alkyl group having 1 to 16 carbon atoms and optionally substituted by one or more fluorine atoms (preferably, C$_{1-16}$ perfluoroalkyl group), a fluorine atom or a hydrogen atom, and Rf$^5$ and Rf$^6$ are more preferably each independently a C$_{1-3}$ perfluoroalkyl group.

a', b', c' and d' each represent the number of repeating units of each type among 4 types of perfluoro(poly)ether constituting a main backbone of a polymer and are each independently an integer of not less than 0 and not more than 300, and the sum of a', b', c' and d' is at least 1, preferably 1 to 300, and more preferably 20 to 300. The order of presence of each repeating unit enclosed in parentheses and affixed with a subscript a', b', c' or d' is arbitrary in the formula. Of these repeating units, —(OC$_4$F$_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OCF$_2$CF(C$_2$F$_5$))—, and is preferably —(OCF$_2$CF$_2$CF$_2$CF$_2$)—. —(OC$_3$F$_6$)— may be any of —(OCF$_2$CF$_2$CF$_2$)—, —(OCF(CF$_3$)CF$_2$)— and —(OCF$_2$CF(CF$_3$)), and is preferably —(OCF$_2$CF$_2$CF$_2$)—. —(OC$_2$F$_4$)— may be either —(OCF$_2$CF$_2$)— or —(OCF(CF$_3$))—, and is preferably —(OCF$_2$CF$_2$)—.

The perfluoro(poly)ether compound represented by formula (3) is, for example, a compound represented by either the following general formula (3a) or (3b) (may be one compound or a mixture of two or more).

$$Rf^5-(OCF_2CF_2CF_2)_{b''}-Rf^6 \quad (3a)$$

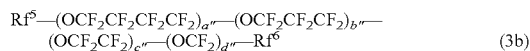
$$Rf^5-(OCF_2CF_2CF_2CF_2)_{a''}-(OCF_2CF_2CF_2)_{b''}-(OCF_2CF_2)_{c''}-(OCF_2)_{d''}-Rf^6 \quad (3b)$$

In these formulas, Rf$^5$ and Rf$^6$ are as described above; in formula (3a), b'' is an integer of not less than 1 and not more than 100; and in formula (3b), a'' and b'' are each independently an integer of not less than 0 and not more than 30, and c'' and d'' are each independently an integer of not less than 1 and not more than 300. The order of presence of each repeating unit enclosed in parentheses and affixed with a subscript a'', b'', c'' or d'' is arbitrary in the formula.

The fluorine-containing oil may have an average molecular weight of 1,000 to 30,000. Owing to this, high surface lubricity can be obtained.

In the surface-treating agent, the fluorine-containing oil may be contained, for example, at 0 to 500 parts by mass, preferably 0 to 400 parts by mass, and more preferably 5 to 300 parts by mass, with respect to the total 100 parts by mass of the fluorine-containing compound (when two or more compounds are used in each, the total mass of them; the same shall apply hereinafter).

The compound represented by the general formula (3a) and the compound represented by the general formula (3b) may be each used alone, or may be each used in combination. The compound represented by the general formula (3b) is preferably used rather than the compound represented by the general formula (3a) because higher surface lubricity is obtained. When these are used in combination, the mass ratio between the compound represented by the general formula (3a) and the compound represented by the general formula (3b) is preferably 1:1 to 1:30, and more preferably 1:1 to 1:10. According to such a mass ratio, a surface-treating layer excellent in a balance between surface lubricity and friction durability can be obtained.

In one embodiment, the fluorine-containing oil contains one or more compounds represented by the general formula (3b). In such an embodiment, the mass ratio between the total amount of the fluorine-containing compounds and the amount of the compound represented by formula (3b) in the surface-treating agent is preferably 10:1 to 1:10, and more preferably 4:1 to 1:4.

In a preferred embodiment, when the antifouling coating layer is formed by a vacuum deposition method, the average molecular weight of the fluorine-containing oil may be made higher than the average molecular weight of the fluorine-containing compound. By adopting such average molecular weights, more excellent friction durability and surface lubricity can be obtained.

From another viewpoint, the fluorine-containing oil may be a compound represented by the general formula Rf$^3$—F (wherein Rf$^3$ is a C$_{5-16}$ perfluoroalkyl group). Alternatively, the fluorine-containing oil may be a chlorotrifluoroethylene oligomer. The compound represented by Rf$^3$—F and the chlorotrifluoroethylene oligomer are preferable because they have high affinity for a compound represented by the fluorine-containing compound having a C$_{1-16}$ perfluoroalkyl group at the end.

The fluorine-containing oil contributes to enhancement in surface lubricity of the antifouling coating layer.

The silicone oil may be a linear or cyclic silicone oil having, for example, not more than 2,000 siloxane bonds. The linear silicone oil may be so-called a straight silicone oil or a modified silicone oil. Examples of the straight silicone oil include dimethyl silicone oil, methyl phenyl silicone oil and methyl hydrogen silicone oil. Examples of the modified silicone oil include those wherein straight silicone oils have been modified with alkyl, aralkyl, polyether, higher fatty acid ester, fluoroalkyl, amino, epoxy, carboxyl, alcohol or the like. The cyclic silicone oil is, for example, cyclic dimethylsiloxane oil.

In the surface-treating agent of the present invention, such a silicone oil can be contained, for example, at 0 to 300 parts by mass, and preferably 0 to 200 parts by mass, with respect to the total 100 parts by mass of the fluorine-containing compound (when two or more compounds are used, the total mass of them; the same shall apply hereinafter).

The silicone oil contributes to enhancement in surface lubricity of the antifouling coating layer.

Examples of the catalyst include transition metals (e.g., Ti, Ni, Sn, and the like).

The catalyst accelerates reaction of the fluorine-containing compound with diamond-like carbon, and accelerates formation of the antifouling coating layer.

In the surface-treating agent of the present invention, the catalyst may be contained, for example, at 0.001 to 20 parts by mass, and more preferably 0.001 to 5 parts by mass, with respect to the total 100 parts by mass of the fluorine-containing compound (when two or more compounds are used, the total mass of them; the same shall apply hereinafter).

The surface-treating agent of the present invention may be formed into a pellet by impregnating the surface-treating agent into a porous material such as a porous ceramic material, or a metal fiber for example that obtained by solidifying a steel wool. The pellets can be used in, for example, vacuum deposition.

The antifouling coating layer may be formed by applying the surface-treating agent to a surface of the diamond-like carbon layer on the base material, and then, if necessary, carrying out post treatment. The method to apply the surface-treating agent is not limited. For example, a wet coating method and a dry coating method can be used.

Examples of the wet coating method include dip coating, spin coating, flow coating, spray coating, roll coating, gravure coating and similar methods.

Examples of the dry coating method include deposition (usually, vacuum deposition), sputtering, CVD and similar methods. Specific examples of the deposition method (usually, vacuum deposition method) include high-frequency heating using resistance heating, electron beam, microwaves or the like, ion beam and similar methods. Specific examples of the CVD method include plasma CVD, optical CVD, thermal CVD and similar methods.

Additionally, coating by an atmospheric pressure plasma method is also possible.

When the wet coating method is used, the surface-treating agent may be applied to the base material surface after diluted with a solvent. From the viewpoints of stability of the surface-treating agent and volatility of the solvent, the following solvents are preferably used: $C_{5-12}$ perfluoroaliphatic hydrocarbons (e.g., perfluorohexane, perfluoromethylcyclohexane and perfluoro-1,3-dimethylcyclohexane); polyfluoroaromatic hydrocarbons (e.g., bis(trifluoromethyl) benzene); polyfluoroaliphatic hydrocarbons (e.g., $C_6F_{13}CH_2CH_3$ (e.g., ASAHIKLIN (trademark) AC-6000 manufactured by Asahi Glass Co., Ltd.), 1,1,2,2,3,3,4-heptafluorocyclopentane (e.g., ZEORORA (trademark) H manufactured by Zeon Corporation)); hydrofluorocarbons (HFC) (e.g., 1,1,1,3,3-pentafluorobutane (HFC-365mfc)); hydrochlorofluorocarbons (e.g., HCFC-225 (ASAHIKLIN (trademark) AK-225)); hydrofluoroethers (HFE) (for example, alkyl perfluoroalkyl ethers (perfluoroalkyl group and alkyl group may be each linear or branched), such as perfluoropropyl methyl ether ($C_3F_7OCH_3$) (e.g., Novec (brand name) 7000 manufactured by Sumitomo 3M Limited), perfluorobutyl methyl ether ($C_4F_9OCH_3$) (e.g., Novec (brand name) 7100 manufactured by Sumitomo 3M Limited), perfluorobutyl ethyl ether ($C_4F_9OC_2H_5$) (e.g., Novec (brand name) 7200 manufactured by Sumitomo 3M Limited), and perfluorohexyl methyl ether ($C_2F_5CF(OCH_3)$ $C_3F_7$) (e.g., Novec (brand name) 7300 manufactured by Sumitomo 3M Limited), or $CF_3CH_2OCF_2CHF_2$ (e.g., ASAHIKLIN (trademark) AE-3000 manufactured by Asahi Glass Co., Ltd.)), 1,2-dichloro-1,3,3,3-tetrafluoro-1-propene (e.g., Vertrel (trademark) Sion manufactured by DuPont-Mitsui Fluorochemicals Co., Ltd.), etc. These solvents can be used alone or as a mixture of a combination of two or more. Moreover, these solvents can also be mixed with other solvents in order to, for example, control the solubility of the fluorine-containing compound.

In one embodiment, for applying the surface-treating agent containing a fluorine-containing compound having a carbon-carbon unsaturated bond as A, a deposition method can be used. Specifically, for applying the surface-treating agent, a method using high-frequency heating (particularly, resistance heating, electron beam) can be used, and more specifically, resistance heating can be used.

In another embodiment, for applying the surface-treating agent containing a fluorine-containing compound having a leaving group as A, a deposition method can be used. Specifically, for applying the surface-treating agent, a method using high-frequency heating (particularly, resistance heating, electron beam) can be used, and more specifically, electron beam can be used.

When the dry coating method is used, the surface-treating agent may be subjected to the dry coating method as it is, or may be subjected to the dry coating method after diluted with the above-described solvent. For example, the surface-treating agent may be subjected to deposition (usually, vacuum deposition) treatment as it is, or a pellet-like material obtained by impregnating the surface-treating agent into a metallic porous material such as iron or copper or a ceramic porous material may be subjected to deposition (usually, vacuum deposition) treatment.

The post treatment is, for example, heat treatment. The temperature of the heat treatment is not limited, and may be, for example, 60 to 250° C., and preferably 100° C. to 180° C. The time of the heat treatment is not limited, and may be, for example, 30 minutes to 5 hours, and preferably 1 to 3 hours.

The thickness of the antifouling coating layer is not limited. For an optical member, the thickness of the antifouling coating layer is 1 to 50 nm, preferably 1 to 30 nm, and more preferably 1 to 15 nm, from the viewpoints of optical performance, surface lubricity, friction durability and antifouling property.

On the surface of the diamond-like carbon layer, the antifouling coating layer (surface-treating layer) is formed in the manner described above using the surface-treating agent, thereby producing the antifouling article of the present invention.

In a preferred embodiment, the antifouling article of the present invention may be an optical member. Examples of the optical member include the following ones: lenses of eye glasses and the like; cathode ray tube (CRT; e.g., TV, computer monitor), front surface protective plate, antireflection plate, polarizing plate and anti-glare plate of displays such as liquid crystal display, plasma display, organic EL display, inorganic thin-film EL dot matrix display, rear projection display, vacuum fluorescent display (VFD) and field emission display (FED; Field Emission Display); touch panel sheets of instrument such as cellular phone and personal digital assistant; disk surfaces of an optical disk such as Blu-ray (Blu-ray (trademark)) disk, DVD disk, CD-R and MO; optical fiber.

Alternatively, the antifouling article of the present invention may be medical equipment or a medical material.

The articles obtained by using the surface-treating agent of the present invention are described in detail hereinbefore. The use application and the method of application of the surface-treating agent of the present invention, the production process for the articles, etc. are not limited to those illustrated above.

EXAMPLES

The present invention is described more specifically with reference to the following Examples, but the present invention is not limited to those Examples.

Example 1

On chemically strengthened glass (manufactured by Corning Incorporated, "Gorilla" glass, thickness 0.7 mm), plasma was generated by a plasma CVD device (raw material gas: methane, plasma generation conditions: pressure $1.0 \times 10^{-3}$ Pa, methane flow rate 20 sccm), thereby forming a diamond-like carbon layer. Subsequently, in a vacuum deposition device, an allyl ether group-containing perfluoropolyether compound (A) having the following average composition was vacuum-deposited on the diamond-like carbon layer by resistance heating in an amount of 0.4 mg per sheet (55 mm×100 mm) of the chemically strengthened glass. Thereafter, the chemically strengthened glass with a deposited coating was heat-treated at a temperature of 150° C. for one hour and allowed to cool at room temperature for not shorter than 100 minutes, and thereafter, the excess antifouling agent on the treated surface was wiped off with ethanol, thereby preparing an antifouling coating layer.

Allyl Ether Group-Containing Perfluoropolyether Compound (A)

$$CF_3CF_2CF_2O(CF_2CF_2CF_2O)_{21}$$
$$CF_2CF_2CH_2OCH_2CH=CH_2$$

Example 2

An antifouling coating layer was formed in the same manner as in Example 1, except that instead of the compound (A), an iodine-containing perfluoropolyether compound (B) having the following average composition was used.

Iodine-Containing Perfluoropolyether Compound (B)

$$CF_3CF_2CF_2O(CF_2CF_2CF_2O)_{21}CF_2CF_2I$$

Comparative Example 1

An antifouling coating layer was formed in the same manner as in Example 1, except that instead of the compound (A), an amino group-containing perfluoropolyether compound (C) having the following average composition was used.

Amino Group-Containing Perfluoropolyether Compound (C)

$$CF_3CF_2CF_2O(CF_2CF_2CF_2O)_{21}CF_2CF_2CH_2NH_2$$

Comparative Example 2

On a surface of chemically strengthened glass (manufactured by Corning Incorporated, "Gorilla" glass, thickness 0.7 mm), silicon dioxide was deposited in a thickness of 7 nm by an electron beam deposition system to form a silicon dioxide film, and a silane group-containing perfluoropolyether compound (D) having the following average composition was vacuum-deposited by resistance heating in an amount of 0.4 mg per sheet (55 mm×100 mm) of the chemically strengthened glass. Thereafter, the chemically strengthened glass with a deposited coating was heat-treated at a temperature of 150° C. for not shorter than 100 minutes and allowed to cool at room temperature for not shorter than one hour, and thereafter, the excess antifouling agent on the treated surface was wiped off with ethanol, thereby preparing an antifouling coating layer.

Silane Group-Containing Perfluoropolyether Compound (D)

$$CF_3CF_2CF_2O(CF_2CF_2CF_2O)_{20}$$
$$CF_2CF_2CH_2OCH_2CH_2CH_2Si(OCH_3)_3$$

Evaluation of Durability to Artificial Sweat

With regard to the antifouling coating layers formed on the diamond-like carbon layers in the above Examples 1 and 2 and Comparative Examples 1 and 2, durability to artificial sweat was evaluated. Specifically, on the base material surface where the antifouling coating layer had been formed, about 1 g of artificial sweat having the following composition was allowed to stand still. After the artificial sweat was allowed to stand still for 24 hours, 48 hours, 96 hours and 168 hours in the above state under the heating and humidifying conditions of 65° C. and a humidity of 90%, the surface was washed with distilled water and ethanol, and thereafter, a static contact angle (degree(s)) of water was measured using a method described below. When the measured value of the contact angle became less than 100 degrees, the evaluation was stopped. The results are set forth in Table 1.

(Composition of Artificial Sweat)
Anhydrous disodium hydrogenphosphate: 2 g
Sodium chloride: 20 g
85% Lactic acid: 2 g
Histidine hydrochloride: 5 g
Distilled water: 1 kg

TABLE 1

| Contact time | Contact angle (degree(s)) | | | |
|---|---|---|---|---|
| (hour(s)) | Ex. 1 | Ex. 2 | Comp. Ex. 1 | Comp. Ex. 2 |
| 0 | 113 | 112 | 112 | 114 |
| 24 | 112 | 111 | 110 | 112 |
| 48 | 112 | 110 | 110 | 107 |
| 96 | 112 | 109 | 108 | 104 |
| 168 | 111 | 109 | 107 | 97 |

Measurement of Static Contact Angle of Water

A static contact angle of water on each of the antifouling coating layers obtained in Examples and Comparative Examples was measured. Measurement of the static contact angle of water was carried out with 1 μL of water in an environment of 21° C. and a humidity of 65% using a contact angle measuring device (manufactured by Kyowa Interface Science Co., Ltd.)

Friction Durability Evaluation

With regard to the surface-treating layers (that is, antifouling coating layers) formed on the base material surfaces in the above Examples 1 and 2 and Comparative Examples 1 and 2, friction durability was evaluated by an eraser friction durability test. Specifically, a sample article in which a surface-treating layer had been formed was horizontally placed, then an eraser (manufactured by KOKUYO Co., Ltd., KESHI-70, planar dimension 1 cm×1.6 cm) was brought into contact with a surface of the surface-treating layer, then a load of 500 gf was applied onto it, and thereafter, the eraser in the load-applied state was moved back and forth at a rate of 20 mm/second. The static contact angle (degree(s)) of water was measured every 500 reciprocation times, and the measurement was repeated until the measured value of the contact angle became less than 100 degrees. The measurement results of the contact angles are set forth in Table 2 (in the table, the symbol "-" means that measurement was not done).

TABLE 2

| Number of frictions | Contact angle (degree(s)) | | | |
|---|---|---|---|---|
| (time(s)) | Ex. 1 | Ex. 2 | Comp. Ex. 1 | Comp. Ex. 2 |
| 0 | 113 | 112 | 112 | 114 |
| 500 | 110 | 108 | 101 | 111 |
| 1000 | 107 | 102 | 95 | 108 |
| 1500 | 104 | 100 | — | 103 |
| 2000 | 102 | 92 | — | 99 |
| 2500 | 98 | — | — | — |

As understood from the results of Table 1 and Table 2, the antifouling coating layers of Examples 1 and 2 were confirmed to exhibit both of excellent sweat resistance and excellent frictional resistance. The reason for this is considered that the diamond-like carbon layer on the base material surface and the fluorine-containing compound were bonded through not only the $sp^2$ orbital but also the $sp^a$ orbital of the diamond-like carbon, and therefore, the bond became stronger, and not only sweat resistance but also frictional resistance were imparted.

On the other hand, it is considered that in Comparative Example 1, the diamond-like carbon layer and the fluorine-containing compound were bonded through only the $sp^2$ orbital of the diamond-like carbon, and therefore, the frictional resistance was poor. It is considered that in Comparative Example 2, the bond between the diamond-like carbon layer and the fluorine-containing compound (D) was a Si—O—Si bond, and therefore, the layer Comparative Example 2 was easily hydrolyzed in an alkaline environment of artificial sweat.

INDUSTRIAL APPLICABILITY

The present invention can be favorably utilized in order to form an antifouling coating layer on various base materials, particularly on a surface of an optical member.

The present invention includes following embodiments:
Embodiment 1. An antifouling article comprising a base material, a diamond-like carbon layer and an antifouling coating layer formed of a surface-treating agent on the diamond-like carbon layer, wherein
the surface-treating agent comprises one or more fluorine-containing compounds represented by any of the following formulas (A1), (A2), (B1) and (B2):

$$(Rf\text{-PFPE})_\alpha\text{-}X^1\text{—}(Y\text{-}A)_\alpha \quad (A1)$$

$$(A\text{-}Y)_\alpha\text{—}X^1\text{-PFPE-}X^1\text{—}(Y\text{-}A)_\alpha \quad (A2)$$

$$(R^{91}\text{—Rf})_{\beta'}\text{—}X^2\text{—}(Y\text{-}A)_\beta \quad (B1)$$

$$(A\text{-}Y)_\beta\text{—}X^2\text{—Rf—}X^2\text{—}(Y\text{-}A)_\beta \quad (B2)$$

wherein
A represents, each independently at each occurrence, a group having a carbon-carbon unsaturated bond, a group having a carbon-nitrogen unsaturated bond, or a leaving group;

Y represents, each independently at each occurrence, a single bond or a divalent organic group;

Rf represents, each independently, an alkyl group having 1 to 16 carbon atoms and optionally substituted by one or more fluorine atoms;

PFPE represents, each independently, —(OC$_6$F$_{12}$)$_a$—(OC$_5$F$_{10}$)$_b$—(OC$_4$F$_8$)$_c$—(OC$_3$F$_6$)$_d$—(OC$_2$F$_4$)$_e$—(OCF$_2$)$_f$—, wherein a, b, c, d, e and f are each independently an integer of not less than 0 and not more than 200, the sum of a, b, c, d, e and f is at least 1, and the order of presence of each repeating unit enclosed in parentheses and affixed with a, b, c, d, e or f is arbitrary in the formula;

$X^1$ represents, each independently, a single bond or a 2-10 valent organic group;

α is each independently at each occurrence, an integer of 1 to 9;

α' is each independently an integer of 1 to 9;

$X^2$ represents, each independently at each occurrence, a single bond or a 2-10 valent organic group;

β is each independently at each occurrence an integer of 1 to 9;

β' is each independently an integer of 1 to 9;

$R^{91}$ represents a fluorine atom, —CHF$_2$ or —CF$_3$; and

Rf' represents, each independently at each occurrence, a perfluoroalkylene group having 1 to 20 carbon atoms.

Embodiment 2. The antifouling article according to Embodiment 1, wherein the carbon-carbon unsaturated bond, the carbon-nitrogen unsaturated bond or the leaving group is present at an end part of a molecular chain of the fluorine-containing compound.

Embodiment 3. The antifouling article according to Embodiment 1 or 2, wherein the leaving group is at least one selected from the group consisting of a functional group containing a metal atom, a halogen atom and an anionic leaving group.

Embodiment 4. The antifouling article according to any one of Embodiments 1 to 3, wherein the carbon-carbon unsaturated bond is a double bond.

Embodiment 5. The antifouling article according to any one of Embodiments 1 to 4, wherein Rf is a perfluoroalkyl group having 1 to 16 carbon atoms.

Embodiment 6. The antifouling article according to any one of Embodiments 1 to 5, wherein PFPE is independently at each occurrence the following formula (a), (b) or (c):

$$—(OC_3F_6)_d— \quad (a)$$

wherein d is an integer of 1 to 200, $$—(OC_4F_8)_c—(OC_3F_6)_d—(OC_2F_4)_e—(OCF_2)_f— \quad (b)$$

wherein c and d are each independently an integer of not less than 0 and not more than 30;

e and f are each independently an integer of not less than 1 and not more than 200;

the sum of c, d, e and f is an integer of not less than 10 and not more than 200; and the order of presence of each repeating unit enclosed in parentheses and affixed with a subscript c, d, e or f is arbitrary in the formula, $$—(R^6—R^7)_j— \quad (c)$$

wherein $R^6$ is OCF$_2$ or OC$_2$F$_4$;

$R^7$ is a group selected from OC$_2$F$_4$, OC$_3$F$_6$, OC$_4$F$_8$, OC$_5$F$_{10}$ and OC$_6$F$_{12}$, or a combination of 2 or 3 groups selected from these groups; and j is an integer of 2 to 100.

Embodiment 7. The antifouling article according to any one of Embodiments 1 to 6, wherein $X^1$ and $X^2$ are each independently a divalent organic group, α and β are each 1, and α' and β' are each 1.

Embodiment 8. The antifouling article according to any one of Embodiments 1 to 7, wherein $X^1$ and $X^2$ are each independently a group represented by $-(R^{31})_{p'}-(X^a)_{q'}-$ wherein $R^{31}$ represents a single bond, $-(CH_2)_{s'}-$ or an o-, m- or p-phenylene group;

s' is an integer of 1 to 20;

$X^a$ represents $-(X^b)_{l'}-$;

$X^b$ represents, each independently at each occurrence, a group selected from the group consisting of $-O-$, $-S-$, an o-, m- or p-phenylene group, $-C(O)O-$, $-Si(R^{33})_2-$, $-(Si(R^{33})_2O)_{m'}-Si(R^{33})_2-$, $-CONR^{34}-$, $-O-CONR^{34}-$, $-NR^{34}-$ and $-(CH_2)_{n'}-$;

$R^{33}$ represents, each independently at each occurrence, a phenyl group, a $C_{1-6}$ alkyl group or a $C_{1-6}$ alkoxy group;

$R^{34}$ represents, each independently at each occurrence, a hydrogen atom, a phenyl group or a $C_{1-6}$ alkyl group;

m' is, each independently at each occurrence, an integer of 1 to 100;

n' is, each independently at each occurrence, an integer of 1 to 20;

l' is an integer of 1 to 10;

p' is 0 or 1;

q' is 0 or 1; and at least one of p' and q' is 1, and the order of presence of each repeating unit enclosed in parentheses and affixed with p' or q' is arbitrary.

Embodiment 9. The antifouling article according to any one of Embodiments 1 to 8, wherein $R^{91}$ is a fluorine atom or $CF_3$.

Embodiment 10. The antifouling article according to any one of Embodiments 1 to 9, wherein the fluorine-containing compound is at least one compound represented by either formula (A1) or (A2).

Embodiment 11 The antifouling article according to any one of Embodiments 1 to 10, wherein the fluorine-containing compound is at least one compound represented by either formula (B1) or (B2).

Embodiment 12. The antifouling article according to any one of Embodiments 1 to 11, wherein the surface-treating agent further comprises one or more other components selected from a fluorine-containing oil, a silicone oil and a catalyst.

Embodiment 13. The antifouling article according to Embodiment 12, wherein the fluorine-containing oil is one or more compounds represented by formula (3):

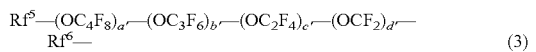
(3)

wherein $Rf^5$ represents an alkyl group having 1 to 16 carbon atoms and optionally substituted by one or more fluorine atoms;

$Rf^6$ represents an alkyl group having 1 to 16 carbon atoms and optionally substituted by one or more fluorine atoms, a fluorine atom or a hydrogen atom; and a', b', c' and d' each represent the number of repeating units of each type among 4 types of perfluoro(poly)ether constituting a main backbone of a polymer and are each independently an integer of not less than 0 and not more than 300, the sum of a', b', c' and d' is at least 1, and the order of presence of each repeating unit enclosed in parentheses and affixed with a subscript a', b', c' or d' is arbitrary in the formula.

Embodiment 14. The antifouling article according to Embodiment 12 or 13, wherein the fluorine-containing oil is one or more compounds represented by formula (3a) or (3b):

(3a)

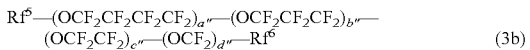
(3b)

wherein $Rf^5$ represents an alkyl group having 1 to 16 carbon atoms and optionally substituted by one or more fluorine atoms;

$Rf^6$ represents an alkyl group having 1 to 16 carbon atoms and optionally substituted by one or more fluorine atoms, a fluorine atom or a hydrogen atom;

in formula (3a), b" is an integer of not less than 1 and not more than 100;

in formula (3b), a" and b" are each independently an integer of not less than 0 and not more than 30, and c" and d" are each independently an integer of not less than 1 and not more than 300; and the order of presence of each repeating unit enclosed in parentheses and affixed with a subscript a", b", c" or d" is arbitrary in the formula.

Embodiment 15. The antifouling article according to any one of Embodiments 1 to 14, wherein the base material is glass or sapphire glass.

Embodiment 16. The antifouling article according to Embodiment 15, wherein the glass is selected from the group consisting of soda-lime glass, alkali aluminosilicate glass, borosilicate glass, alkali-free glass, crystal glass and quartz glass.

Embodiment 17. The antifouling article according to any one of Embodiments 1 to 16, wherein the article is an optical member.

The invention claimed is:

1. An antifouling article comprising a base material, a diamond-like carbon layer and an antifouling coating layer formed of a surface-treating agent on the diamond-like carbon layer, wherein the surface-treating agent comprises one or more fluorine-containing compounds represented by any of the following formulas (A1), (A2), (B1) and (B2):

 (A1)

 (A2)

 (B1)

 (B2)

wherein

A represents, each independently at each occurrence, a cyano group, an oxime derivative group, a nitro group, a trimethylsilyl group, a titanium alkoxide group, a titanium acylate group, a functional group containing a transition metal, a bromine atom, an iodine atom, a methyl sulfate ion, a methanesulfonate ion, a trifluoromethanesulfonate ion, or a 4-methylbenzenesulfonate ion;

when A is a bromine atom or an iodine atom, A is directly bonded to a carbon atom;

Y represents, each independently at each occurrence, a single bond or a divalent organic group;

Rf represents, each independently, an alkyl group having 1 to 16 carbon atoms and optionally substituted by one or more fluorine atoms;

PFPE represents, each independently, $-(OC_6F_{12})_a-(OC_5F_{10})_b-(OC_4F_8)_c-(OC_3F_6)_d-(OC_2F_4)_e-$ (OCF$_2$)$_f$—, wherein a, b, c, d, e and f are each independently an integer of not less than 0 and not more than 200, the sum of a, b, c, d, e and f is at least 1, and the order of presence of each repeating unit enclosed in parentheses and affixed with a, b, c, d, e or f is arbitrary in the formula;

X$^1$ represents, each independently, a single bond or a 2-10 valent organic group;

α is each independently at each occurrence, an integer of 1 to 9;

α' is each independently an integer of 1 to 9;

X$^2$ represents, each independently at each occurrence, a single bond or a 2-10 valent organic group;

β is each independently at each occurrence an integer of 1 to 9;

β' is each independently an integer of 1 to 9;

R$^{91}$ represents a fluorine atom, —CHF$_2$ or —CF$_3$; and

Rf represents, each independently at each occurrence, a perfluoroalkylene group having 1 to 20 carbon atoms.

2. The antifouling article according to claim 1, wherein A is present at an end part of a molecular chain of the fluorine-containing compound.

3. The antifouling article according to claim 1, wherein Rf is a perfluoroalkyl group having 1 to 16 carbon atoms.

4. The antifouling article according to claim 1, wherein PFPE is independently at each occurrence the following formula (a), (b) or (c):

—(OC$_3$F$_6$)$_d$—     (a)

wherein d is an integer of 1 to 200,

—(OC$_4$F$_8$)$_c$—(OC$_3$F$_6$)$_d$—(OC$_2$F$_4$)$_e$—(OCF$_2$)$_f$—     (b)

wherein c and d are each independently an integer of not less than 0 and not more than 30;

e and f are each independently an integer of not less than 1 and not more than 200;

the sum of c, d, e and f is an integer of not less than 10 and not more than 200; and the order of presence of each repeating unit enclosed in parentheses and affixed with a subscript c, d, e or f is arbitrary in the formula, —(R$^6$—R$^7$)$_j$—     (c)

wherein R$^6$ is OCF$_2$ or OC$_2$F$_4$;

R$^7$ is a group selected from OC$_2$F$_4$, OC$_3$F$_6$, OC$_4$F$_8$, OC$_5$F$_{10}$ and OC$_6$F$_{12}$, or a combination of 2 or 3 groups selected from these groups; and j is an integer of 2 to 100.

5. The antifouling article according to claim 1, wherein X$^1$ and X$^2$ are each independently a divalent organic group, α and β are each 1, and α' and β' are each 1.

6. The antifouling article according to claim 1, wherein X$^1$ and X$^2$ are each independently a group represented by —(R$^{31}$)$_{p'}$—(X$^a$)$_{q'}$— wherein

R$^{31}$ represents a single bond, —(CH$_2$)$_{s'}$— or an o-, m- or p-phenylene group;

s' is an integer of 1 to 20;

X$^a$ represents —(X$^b$)$_{l'}$—;

X$^b$ represents, each independently at each occurrence, a group selected from the group consisting of —O—, —S—, an o-, m- or p-phenylene group, —C(O)O—, —Si(R$^{33}$)$_2$—, —(Si(R$^{33}$)$_2$O)$_{m'}$—Si(R$^{33}$)$_2$—, —CONR$^{34}$—, —O—CONR$^{34}$—, —NR$^{34}$— and —(CH$_2$)$_{n'}$—;

R$^{33}$ represents, each independently at each occurrence, a phenyl group, a C$_{1-6}$ alkyl group or a C$_{1-6}$ alkoxy group;

R$^{34}$ represents, each independently at each occurrence, a hydrogen atom, a phenyl group or a C$_{1-6}$ alkyl group;

m' is, each independently at each occurrence, an integer of 1 to 100;

n' is, each independently at each occurrence, an integer of 1 to 20;

l' is an integer of 1 to 10;

p' is 0 or 1;

q' is 0 or 1; and at least one of p' and q' is 1, and the order of presence of each repeating unit enclosed in parentheses and affixed with p' or q' is arbitrary.

7. The antifouling article according to claim 1, wherein R$^{91}$ is a fluorine atom or CF$_3$.

8. The antifouling article according to claim 1, wherein the fluorine-containing compound is at least one compound represented by either formula (A1) or (A2).

9. The antifouling article according to claim 1, wherein the fluorine-containing compound is at least one compound represented by either formula (B1) or (B2).

10. The antifouling article according to claim 1, wherein the surface-treating agent further comprises one or more other components selected from a fluorine-containing oil, a silicone oil and a catalyst.

11. The antifouling article according to claim 10, wherein the fluorine-containing oil is one or more compounds represented by formula (3):

Rf$^5$—(OC$_4$F$_8$)$_{a'}$—(OC$_3$F$_6$)$_{b'}$—(OC$_2$F$_4$)$_{c'}$—(OCF$_2$)$_{d'}$—Rf$^6$—     (3)

wherein

Rf$^5$ represents an alkyl group having 1 to 16 carbon atoms and optionally substituted by one or more fluorine atoms;

Rf$^6$ represents an alkyl group having 1 to 16 carbon atoms and optionally substituted by one or more fluorine atoms, a fluorine atom or a hydrogen atom; and a', b', c' and d' each represent the number of repeating units of each type among 4 types of perfluoro(poly)ether constituting a main backbone of a polymer and are each independently an integer of not less than 0 and not more than 300, the sum of a', b', c' and d' is at least 1, and the order of presence of each repeating unit enclosed in parentheses and affixed with a subscript a', b', c' or d' is arbitrary in the formula.

12. The antifouling article according to claim 10, wherein the fluorine-containing oil is one or more compounds represented by formula (3a) or (3b):

Rf$^5$—(OCF$_2$CF$_2$CF$_2$)$_{b''}$—Rf$^6$     (3a)

Rf$^5$—(OCF$_2$CF$_2$CF$_2$CF$_2$)$_{a''}$—(OCF$_2$CF$_2$CF$_2$)$_{b''}$—(OCF$_2$CF$_2$)$_{c''}$—(OCF$_2$)$_{d''}$—Rf$^6$     (3b)

wherein

Rf$^5$ represents an alkyl group having 1 to 16 carbon atoms and optionally substituted by one or more fluorine atoms;

Rf$^6$ represents an alkyl group having 1 to 16 carbon atoms and optionally substituted by one or more fluorine atoms, a fluorine atom or a hydrogen atom;

in formula (3a), b" is an integer of not less than 1 and not more than 100;

in formula (3b), a" and b" are each independently an integer of not less than 0 and not more than 30, and c" and d" are each independently an integer of not less than 1 and not more than 300; and the order of presence of each repeating unit enclosed in parentheses and affixed with a subscript a", b", c" or d" is arbitrary in the formula.

13. The antifouling article according to claim 1, wherein the base material is glass or sapphire glass.

14. The antifouling article according to claim 13, wherein the glass is selected from the group consisting of soda-lime glass, alkali aluminosilicate glass, borosilicate glass, alkali-free glass, crystal glass and quartz glass.

15. The antifouling article according to claim 1, wherein the article is an optical member.

16. The antifouling article according to claim 1, wherein A is a cyano group, an oxime derivative group, or a nitro group.

17. The antifouling article according to claim 1, wherein A is a trimethylsilyl group, a titanium alkoxide group, a titanium acylate group, or a functional group containing a transition metal.

18. The antifouling article according to claim 1, wherein A is a bromine atom or an iodine atom.

19. The antifouling article according to claim 1, wherein A is a methyl sulfate ion, a methanesulfonate ion, a trifluoromethanesulfonate ion, or a 4-methylbenzenesulfonate ion.

* * * * *